United States Patent
Bates et al.

(10) Patent No.: US 7,552,425 B2
(45) Date of Patent: Jun. 23, 2009

(54) IMPLEMENTING ENHANCED COMPILED BREAKPOINT ANALYSIS

(75) Inventors: Cary Lee Bates, Rochester, MN (US); Victor John Gettler, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 846 days.

(21) Appl. No.: 10/921,591

(22) Filed: Aug. 19, 2004

(65) Prior Publication Data

US 2006/0041867 A1 Feb. 23, 2006

(51) Int. Cl.
*G06F 9/44* (2006.01)
*G06F 11/00* (2006.01)

(52) U.S. Cl. ............ 717/129; 717/130; 717/131; 714/35

(58) Field of Classification Search ......... 717/129, 717/130, 131; 714/34, 35
See application file for complete search history.

(56) References Cited

U.S. PATENT DOCUMENTS

| | | | | |
|---|---|---|---|---|
| 6,077,312 A | * | 6/2000 | Bates et al. | 717/129 |
| 6,493,868 B1 | * | 12/2002 | DaSilva et al. | 717/105 |
| 6,708,326 B1 | * | 3/2004 | Bhattacarya | 717/124 |
| 7,225,433 B2 | * | 5/2007 | Jentsch et al. | 717/129 |
| 7,266,809 B2 | * | 9/2007 | Tsubata et al. | 717/129 |
| 7,464,373 B1 | * | 12/2008 | Yunt et al. | 717/125 |
| 2003/0028862 A1 | * | 2/2003 | Bates et al. | 717/129 |
| 2003/0208746 A1 | * | 11/2003 | Bates et al. | 717/129 |
| 2003/0217354 A1 | * | 11/2003 | Bates et al. | 717/129 |
| 2004/0153818 A1 | * | 8/2004 | Woodall | 714/37 |
| 2005/0028036 A1 | * | 2/2005 | Shibata | 714/38 |
| 2005/0289396 A1 | * | 12/2005 | Hooper et al. | 714/34 |

\* cited by examiner

*Primary Examiner*—Insun Kang
(74) *Attorney, Agent, or Firm*—Joan Pennington (57) ABSTRACT

Compiled breakpoint analysis includes a debugger user interface that is displayed for defining breakpoint properties. Responsive to a predefined user selection, a conditional breakpoint and condition are exported to be compiled for debug. When a source module is compiled for debug, the conditional breakpoint is inserted into the program executable for a user-selected line. When debugging the program executable, the compiled conditional breakpoint is identified. A compiled breakpoint table is used to set a conditional breakpoint on the user-selected line and to identify statement numbers for the true and false legs of a compiled condition.

14 Claims, 9 Drawing Sheets

300 if ( ___condbp53 && ( all == 0 ) )

statement 40;

else statement 40;

BREAKPOINT TABLE IN PROGRAM 136

| Addr | Stmt. | Replace Opcode | Cond. BP | Condition |
|---|---|---|---|---|
| 2FC123 | 230 | LoD | N | |
| | | | | |

COMPILED BREAKPOINT TABLE 138

| Stmt. # | Cond. | True Stmt. # | False Stmt. # |
|---|---|---|---|
| 23 | index == 25 | 230 | 231 |
| | | | |

FIG. 9

IMPLEMENTING ENHANCED COMPILED BREAKPOINT ANALYSIS

FIELD OF THE INVENTION

The present invention relates generally to the data processing field, and more particularly, relates to a method, apparatus and computer program product for implementing compiled breakpoint analysis that enables rapid evaluation.

DESCRIPTION OF THE RELATED ART

An important aspect of the design and development of a computer program is a process known as debugging. A computer programmer to locate and identify errors in a program under development performs debugging. Typically, a programmer uses another computer program commonly known as a debugger to debug a program under development. Conventional debuggers typically support various operations to assist a computer programmer. Each operation allows the programmer to examine the state of program registers and variables at a given point in the execution of a program.

When unconditional breakpoints are reached, execution of the program is halted so that the state of the program can be examined by a computer programmer.

Today many programmers set conditional breakpoints in frequently accessed or hot sections of code waiting for an error condition to occur. When conditional breakpoints are reached execution of the program is halted only when a variable used by the program is set to a predetermined value at the time such a breakpoint is reached.

However, a problem is that it often takes an unacceptable amount of time to process the conditional breakpoint as it is encountered over and over without firing. When a breakpoint is encountered, the processor hits either an invalid instruction or a special instruction that tells the process this is a breakpoint. For example, when the breakpoint is set the first instruction of the statement which the breakpoint is set on is saved and this invalid instruction is written over the top of it. When execution reaches the invalid instruction a trap occurs which is handled by a breakpoint handler. Execution must be suspended, and the condition associated with the conditional breakpoint evaluated by an interpreter to determine if the breakpoint should fire. Assuming the condition is determined to be false, execution is resumed by emulating the replaced instruction, then allowing the program to run.

When a breakpoint is set in a hot section of code, it can result in the program running 100's or even 1000's of times longer than it did without the breakpoint.

In many applications there are a few spots where inserting a conditional breakpoint can help to determine in which part of the application to start a debug session, therefore saving a lot of debug time. In this case, the breakpoint condition used is typically the same, or based on the same condition, each time the breakpoint is set. This approach usually is effective, unless the breakpoint is inserted into a hot section of code, which seems to be common when trying to locate problems, for example, that happen only when a web server is very busy, or when a database application is being used extensively. In these cases, normal conditional breakpoints can have very bad side effects, causing the program to run for an unacceptable length of time. When this happens the programmer starts guessing where the problem may be and has to revert to other less efficient means of debug which are less effective.

A need exists for a mechanism for implementing compiled breakpoint analysis that enables rapid evaluation.

SUMMARY OF THE INVENTION

A principal aspect of the present invention is to provide a method, apparatus and computer program product for implementing compiled breakpoint analysis. Other important aspects of the present invention are to provide such method, apparatus and computer program product for implementing compiled breakpoint analysis substantially without negative effect and that overcome many of the disadvantages of prior art arrangements.

In accordance with features of the invention, a breakpoint location and breakpoint condition is exported by a debugger program to an Integrated Development Environment (IDE) so that when the source module is compiled for debug, additional code is installed into the module such that the breakpoint condition is in-line and breakpoint overhead minimized.

In brief, a method, apparatus and computer program product are provided for implementing compiled breakpoint analysis. A debugger graphical user interface is provided for defining breakpoint properties. Responsive to a predefined user selection, a conditional breakpoint and a breakpoint condition are exported to be compiled for debug. When a source module is compiled for debug, the conditional breakpoint is inserted into the program executable for a user-selected line. When debugging the program executable, the compiled conditional breakpoint is identified. Compiled breakpoint information is used to set a conditional breakpoint on the user-selected line and to identify statement numbers for the true and false legs of a compiled condition.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1A:
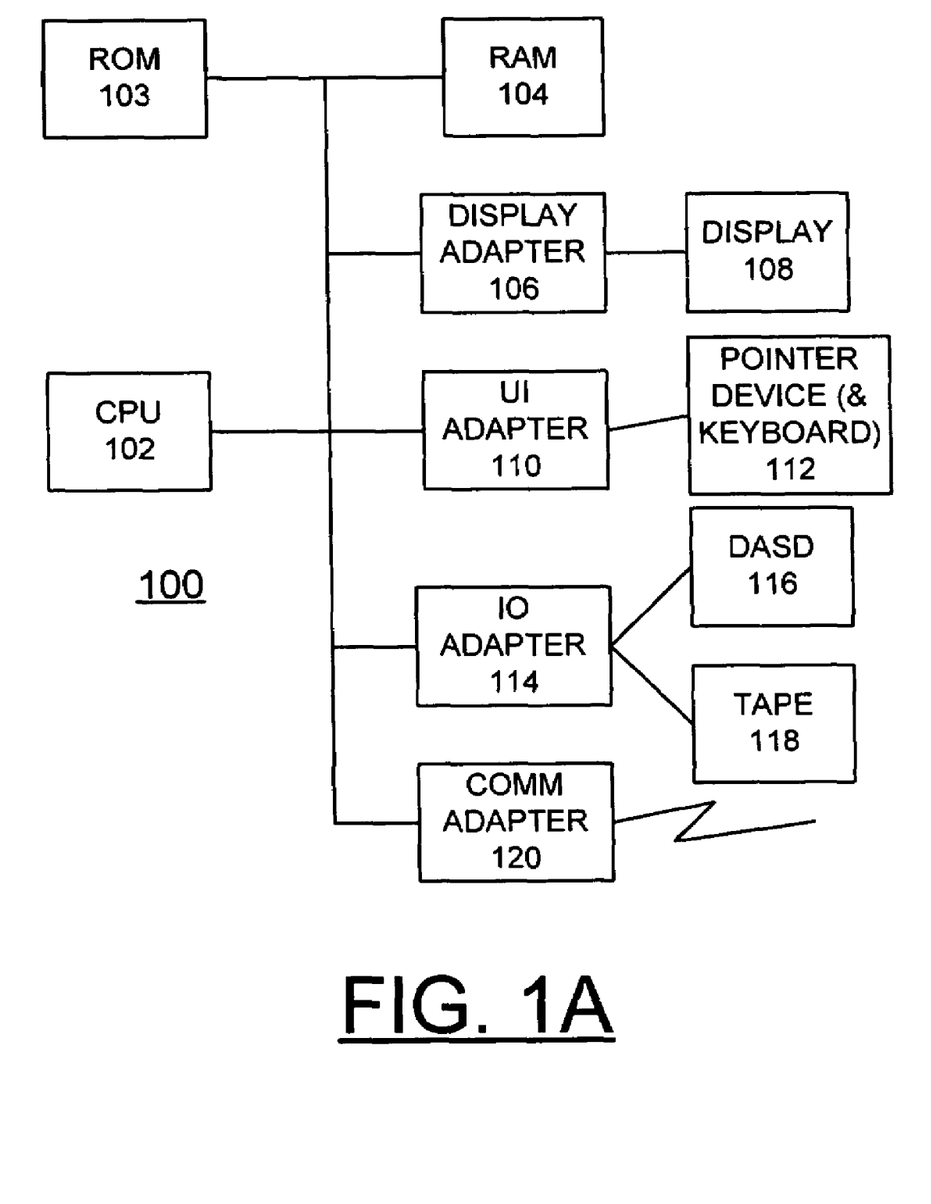
FIGS. 1A and 1B are block diagram representations illustrating a computer system and operating system for implementing enhanced compiled breakpoint analysis in accordance with the preferred embodiment.
Figure 1B:
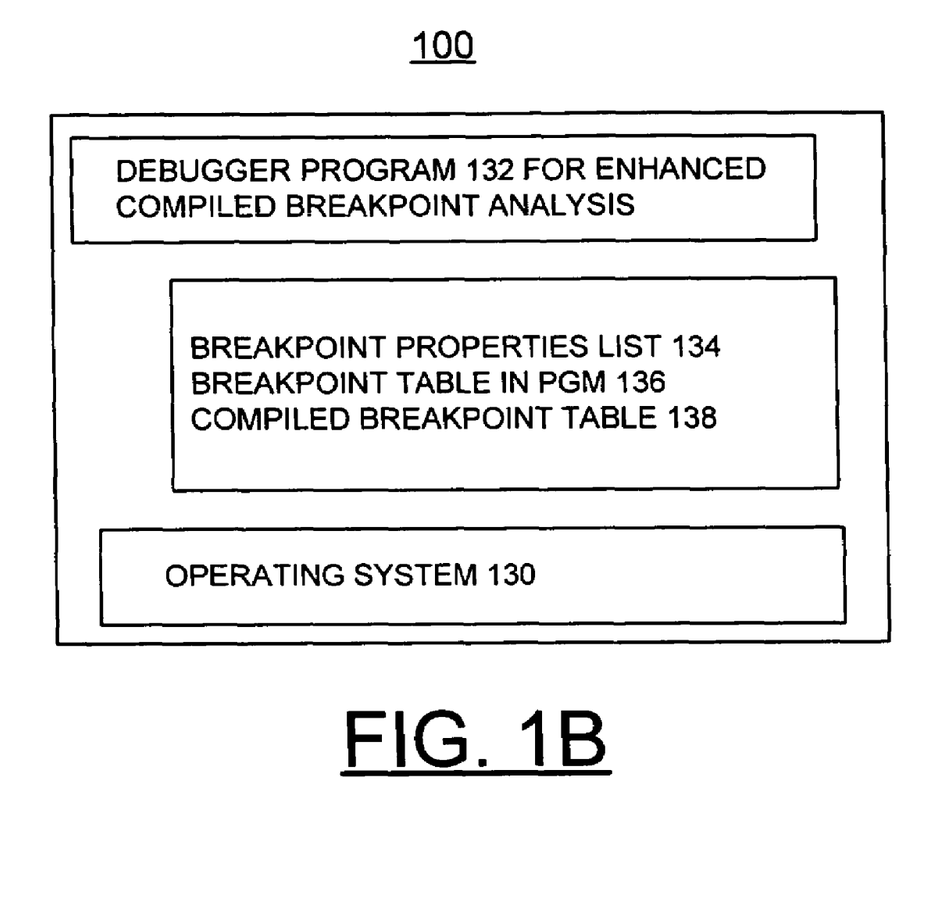

Referring now to the drawings, in FIGS. 1A and 1B there is shown a computer system generally designated by the reference character 100 for implementing enhanced compiled breakpoint analysis enabling rapid evaluation in accordance with the preferred embodiment. Computer system 100 includes a main processor 102 or central processor unit (CPU) 102 coupled by a system bus to a read only memory (ROM) 103 and a random access memory (RAM) 104. Computer system 100 includes a display interface 106 connected to a display 108, and a user interface (UI) adapter 110 connected to a user entry pointer device and keyboard 112. Computer system 100 includes an I/O adapter 114 that connects a direct access storage device (DASD) 116 and a tape 118 to the main processor 102. Computer system 110 includes a communications adapter 120.

Computer system 100 is shown in simplified form sufficient for understanding the present invention. The illustrated computer system 100 is not intended to imply architectural or functional limitations. The present invention can be used with various hardware implementations and systems and various other internal hardware devices, for example, multiple main processors.

As shown in FIG. 1B, computer system 100 includes an operating system 130, and a debugger program 132 for enhanced compiled breakpoint analysis of the preferred embodiment using a breakpoint properties list 134, a breakpoint table 136 in a program under test, and a compiled breakpoint table 138 of the preferred embodiment.

In accordance with features of the preferred embodiment, a method of the invention allows a breakpoint location and breakpoint condition to be exported by the debugger program 132 to the Integrated Development Environment (IDE) such that in the future when the source module is recompiled for debug, additional code is installed into the module such that the breakpoint condition will be in-line and breakpoint overhead minimized.

Various commercially available computers can be used for computer system 100; for example, an iSeries computer system manufactured and sold by International Business Machines Corporation and processor 102 can be implemented, for example, by one of a line of PowerPC processors manufactured and sold by International Business Machines Corporation. Central processor unit 102 is suitably programmed to execute the flowchart of FIG. 8 to generate the enhanced GUI breakpoint properties screen of FIG. 2 and to generate respective graphical user interface screens including enhanced breakpoint properties and compiled conditional breakpoint source code of the preferred embodiment as illustrated and described with respect to FIGS. 4 and 5.

In accordance with features of the preferred embodiment, users are allowed to export common conditional breakpoints to the IDE to be compiled into a debuggable version of a program under test.

Figure 2:
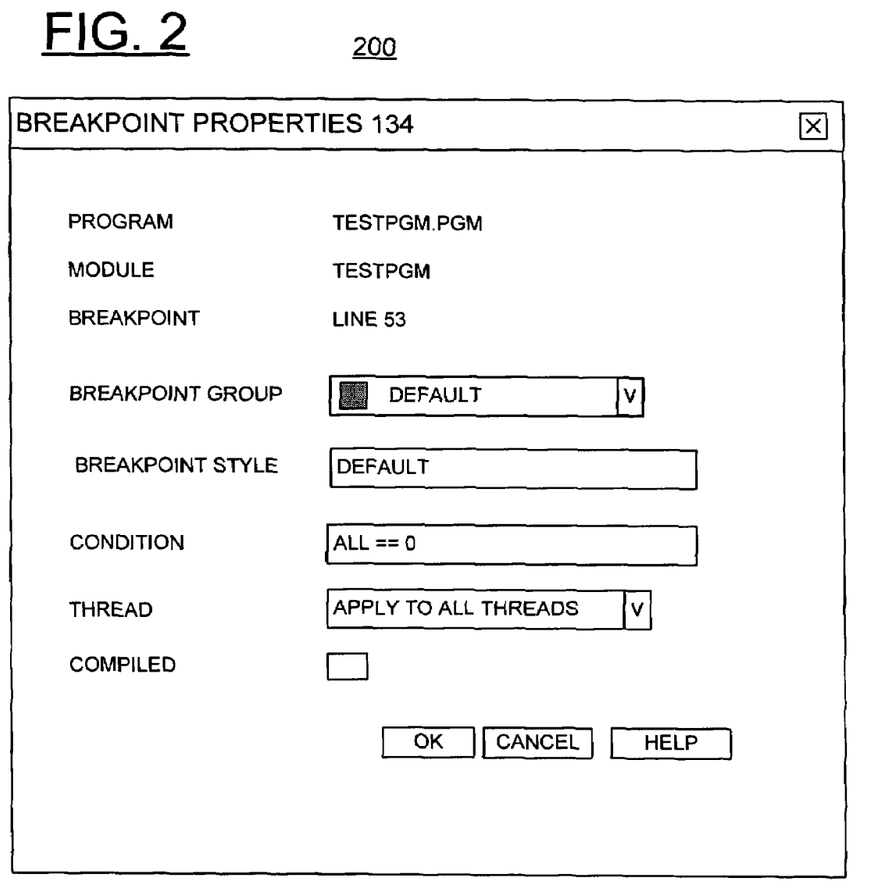
FIG. 2 illustrates an exemplary graphical user interface screen including breakpoint properties in accordance with the preferred embodiment.

FIG. 2 illustrates an exemplary graphical user interface generally designated by the reference character 200 including breakpoint properties 134 in accordance with the preferred embodiment. GUI 200 illustrating exemplary breakpoint properties 134 that enable a user of the breakpoint properties dialog associated with a breakpoint on a user selected line for a particular program and program module to define a breakpoint group, a breakpoint style, a condition for the breakpoint, and a thread. Breakpoint properties 134 include a user-entered selection or check box labeled COMPILED to export user defined conditional breakpoints to the IDE.

Figure 3:
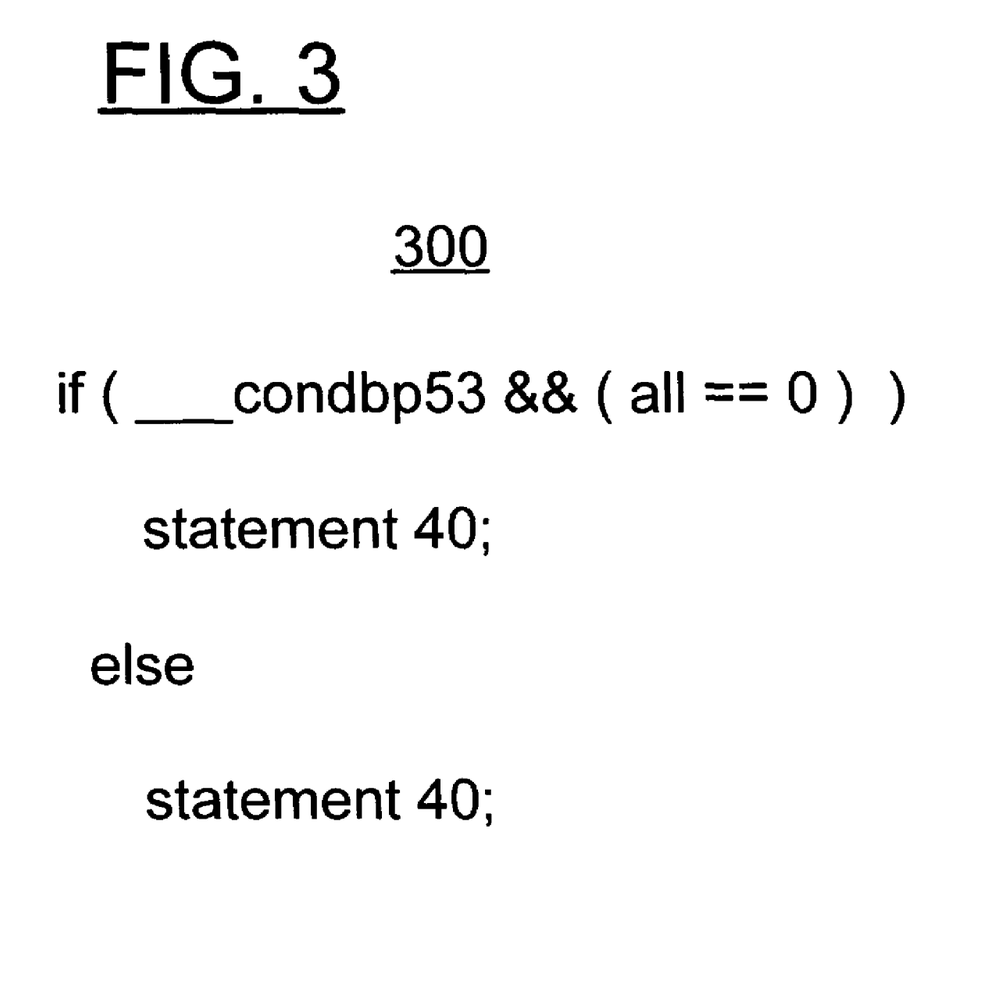
FIG. 3 illustrates an exemplary source code including an exemplary conditional breakpoint expression in accordance with the preferred embodiment.

FIG. 3 illustrates an exemplary source code generally designated by the reference character 300 including an exemplary conditional breakpoint expression in accordance with the preferred embodiment.

Figure 4:
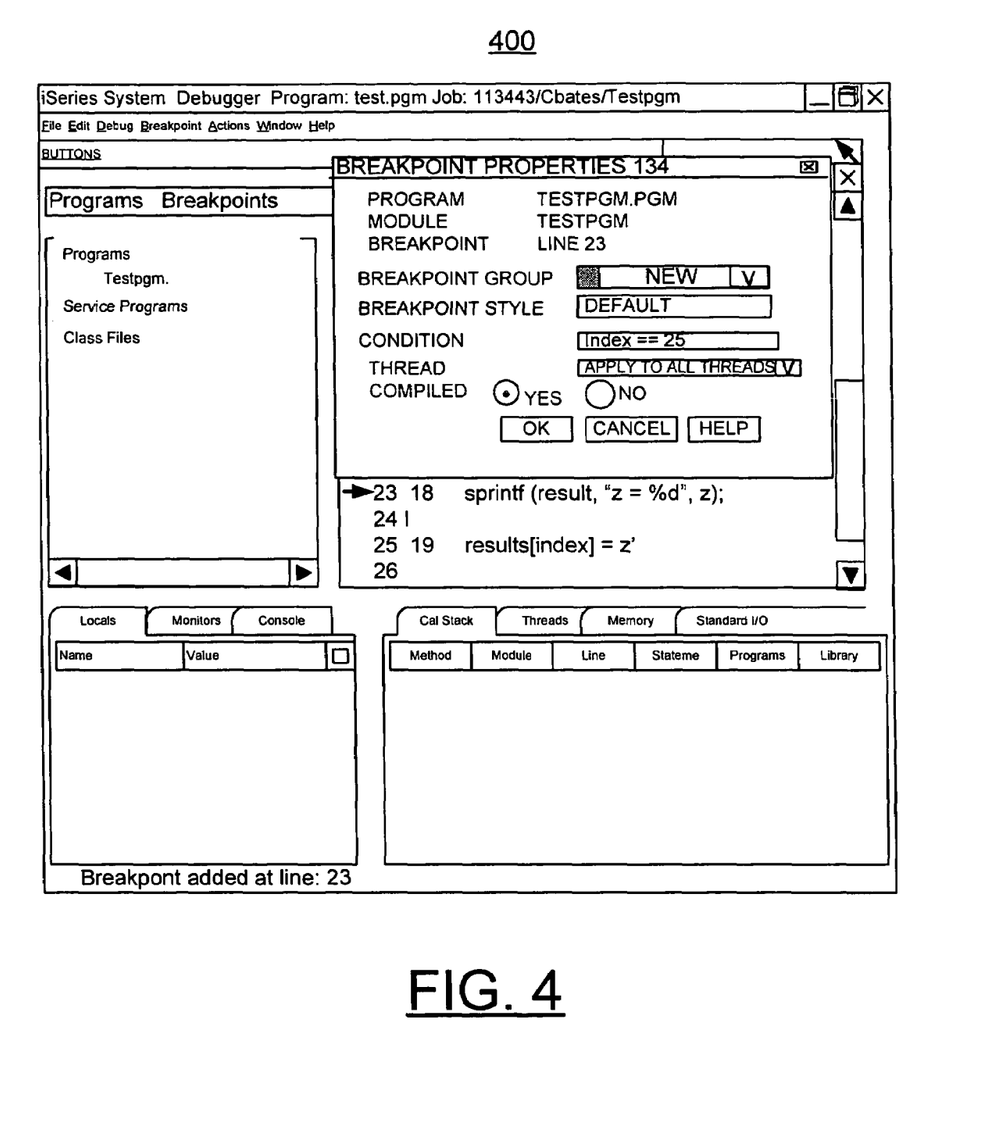
FIG. 4 illustrates an exemplary graphical user interface including breakpoint properties in accordance with the preferred embodiment.

Having reference also to FIG. 4, to export common conditional breakpoints to the IDE the user simply selects the compiled check box in the exemplary graphical user interface as shown. This user entered selection causes the breakpoint and condition to be exported to the IDE. The IDE interacts with the compiler or pre-processor to cause the additional code to be compiled into the module, allowing this breakpoint much improved performance on future runs.

For example, as shown in the FIG. 2, the user sets a conditional breakpoint on line 53 which contains statement 40. In the illustrated example of FIG. 2, the conditional expression is "all==0".

As shown in FIG. 3, assuming that the user checks the compiled box, the next time the user compiles the code, the compiler or a preprocessor to the compiler would generate to the following code in place of statement 40, or something generally equivalent:

```
if (_condbp53 && ( all == 0 ) )
    statement 40;
else
    statement 40;
```

_condbp53 is an identifier introduced into the program. This identifier is used to determine if the breakpoint is active. The breakpoint is statically set to false, but if a conditional breakpoint is set at line 53 which uses the condition all==0, _condbp53 will be set true by the debugger program 132 and a normal breakpoint will be set on the true leg. Now when the breakpoint is hit and the condition is false, there will be only a minor amount of overhead introduced to execute the compiled conditional expression (_condbp53 && (all==0)).

In accordance with features of the preferred embodiment, when the breakpoint is set in the true leg and the breakpoint will not be encountered unless the condition is true, thus avoiding the heavy overhead typical of actually hitting a breakpoint repeatedly of conventional debugger arrangements. When the breakpoint is not set the only overhead is the conditional instructions that load and test the introduced variable: _condbp53.

Figure 5:
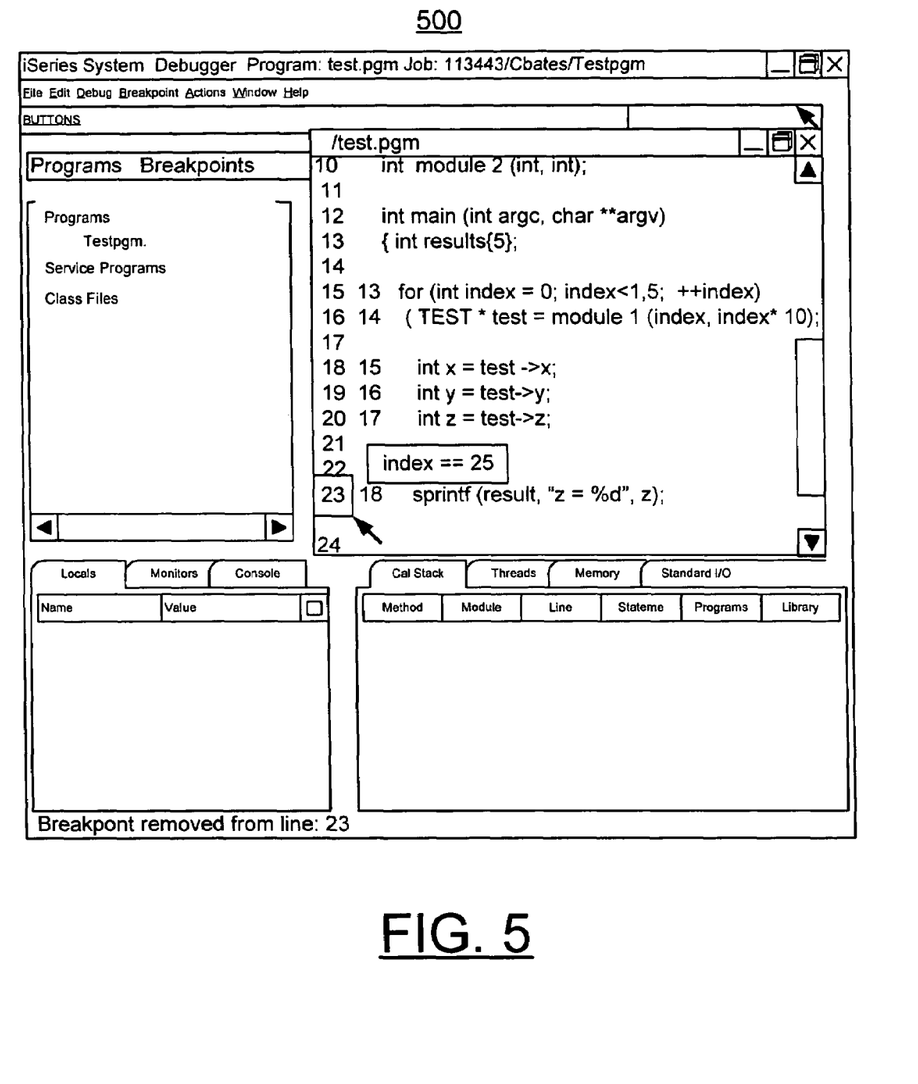
FIG. 5 illustrates an exemplary graphical user interface including an exemplary conditional breakpoint source code in accordance with the preferred embodiment.
Figure 6:
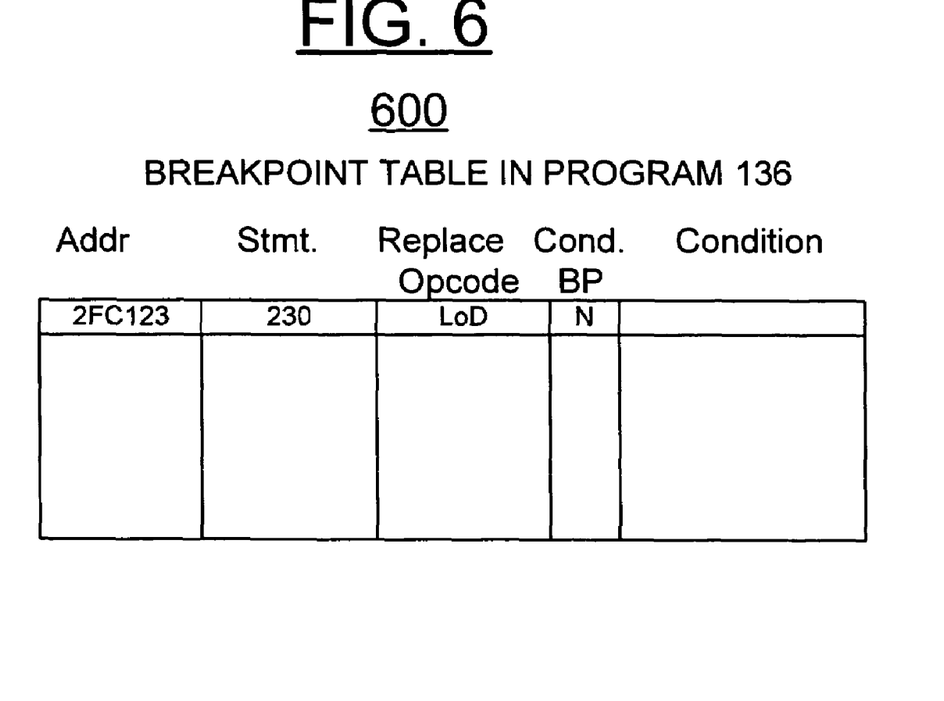
FIGS. 6 and 7 are charts respectively illustrating an exemplary breakpoint table in a program under test and an exemplary compiled breakpoint table in accordance with the preferred embodiment.
Figure 7:
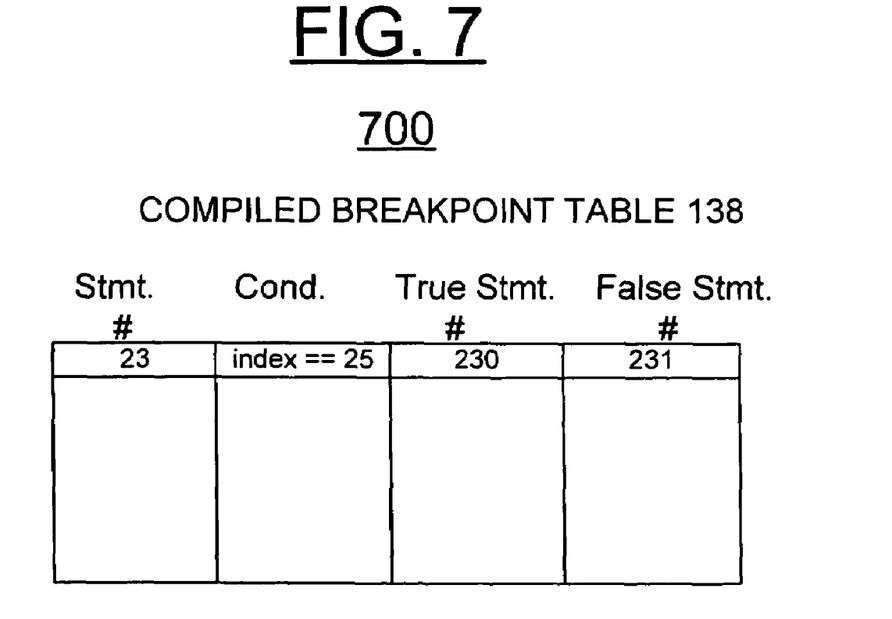

Information about this breakpoint is inserted into the debug data for the module by a compiler or preprocessor that gets compiled breakpoint information from a file written by the debugger program 132 of the preferred embodiment, for example, as shown in FIGS. 2, 3, 4, and 5; and for example, a pair of breakpoint tables illustrated and described with respect to FIGS. 6 and 7. As shown in FIGS. 2, and 3, 4, and 5, this information tells the debugger program 132 that a compiled conditional breakpoint exists at line 53 with the condition (all==0). It also provides the debugger program 132 with the statement numbers of the true and false legs of the inserted code. As shown in FIGS. 4, and 5, this information tells the debugger program 132 that a compiled conditional breakpoint exists at line 23 with the condition (index==25).

The debugger program 132 advantageously uses this information in multiple ways. The debugger program 132 highlights a user selected program line to indicate that a compiled breakpoint is available at that location so the user will know that they can take advantage of it if needed, and to select removal of the compiled breakpoint on the next compile, if desired. The debugger program 132 uses this information when the user sets a conditional breakpoint on the given line. First it checks to see if the compiled condition is the same or a subset of the actual condition being specified, and then sets the breakpoint on the appropriate leg, and sets the _condbb# variable to true to activate the breakpoint.

In the event that the compiled condition does not at all match the condition specified for the conditional breakpoint being set at the location of the compiled breakpoint, a normal conditional breakpoint is set on the false leg and the _condpb# variable is not set to true, but if the compiled condition is a subset of the actual conditional expression specified during the debug session then additional logic comes into play. There will be situations where though the entire condition is a subset of the actual conditional expression specified during the debug session then additional logic comes into play. There will be situations where though the entire conditional expression will not be compiled in, a significant portion of the conditional expression will be, which saves valuable execution time.

For example, consider the case where the compile condition is all==0 and the user specifies a debug breakpoint condition of "(all==0) && (counter>10)". A conditional breakpoint contingent only on (counter>10) will be set on the true leg and the _condpb# variable is set to true. Only if the compiled condition of "all==0" is true will the debugger's conditional breakpoint be processed.

For example, consider the case where the user specifies a debug breakpoint condition of "(all==0) || (counter>10)". A conditional breakpoint contingent only on (counter>10) will be set on the false leg and normal breakpoint is set on the true leg. If the compile condition all==0 is false, the debugger's simplified conditional breakpoint will be processed.

Expression matching advantageously is optimized by actions such as converting each expression into a binary tree data structure for ease of programmatic manipulation. Normalizing each expression by applying rules of operator precedence for the given programming language and by applying various algebra postulates, such as, the following:

Postulates of Equality:
  Symmetric Property of Equality: if a=b, then b=a.
  Transitive Property of Equality: if a=b and b=c, then a=c Postulates of Equality and Operations:
  Addition Property of Equality: if a=b, then a+c=b+c.
  Multiplication Property of Equality: if a=-b, then a*c=b*c.
  Substitution Property of Equality: If a=b, then a can be substituted for b in any equation or inequality.
  Subtraction Property of Equality: if a=b, then a-c=b-c.

Postulates of Inequality and Operations:
  Addition Property of Inequality: If a<>b, then a+c<>b+c.
  Multiplication Property of Inequality:
  if a<b and c>0, then a*c<b*c;
  if a<b and c<0, then a*c>b*c.
  Equation to Inequality Property:
  If a and b are positive, and a+b=c, then c>a and c>b;
  if a and b are negative, and a+b=c, then c<a and c<b.
  Subtraction Property of Inequality: if a<>b, then a-c<>b-c.
  Transitive Property of Inequality: if a<b and b<c, then a<c.

Postulates of Operation:
  Commutative Property of Addition: a+b=b+a.
  Commutative Property of Multiplication: a*b=b*a.
  Distributive Property: a*(b+c)=a*b+a*c (and vice versa).

For example, if the compile expression is "A && (C||B)" and the conditional breakpoint expression is (A && B|| (C && A) then the binary trees can be created and manipulated using the previously mentioned rules. It can be seen that the compile condition and the breakpoint conditional are the same expression.

In accordance with features of the preferred embodiment, by selecting a frequently used sub expression for the compiled breakpoint, performance can be improved on more involved expressions. The compiled breakpoint is only compiled into programs that are compiled for debug. While a statement being duplicated can be provided in both legs of the condition, more advanced embodiments that act at the machine code level are able to provide an expansion that may only put the first instruction of the statement within the conditional part with the remaining instructions of a statement following.

FIG. 4 illustrates an exemplary graphical user interface generally designated by the reference character 400 including breakpoint properties 134 in accordance with the preferred embodiment. In FIG. 4, a conditional breakpoint is set at line 23 which uses the condition index==25.

FIG. 5 illustrates an exemplary graphical user interface generally designated by the reference character 500 including an exemplary compiled conditional breakpoint source code in accordance with the preferred embodiment. The exemplary graphical user interface 500 illustrates an exemplary compiled conditional breakpoint source code resulting from the user selected properties dialog associated with a breakpoint of FIG. 4 with the conditional breakpoint set at line 23 using the condition index==25.

FIGS. 6 and 7 are charts respectively illustrating an exemplary breakpoint table 136 in a program under test generally designated by the reference character 600 and an exemplary compiled breakpoint table 138 generally designated by the reference character 700 in accordance with the preferred embodiment. Chart 600 illustrates the exemplary breakpoint table 136 in a program under test that includes entries of an address, a statement number, a replace operation code or replace opcode, a selection of a conditional breakpoint (BP), and a condition. Chart 700 illustrates the exemplary compiled breakpoint table 138 that includes entries of a statement number and a condition for the breakpoint, a true statement number and a false statement number for the compiled breakpoint.

Figure 8:
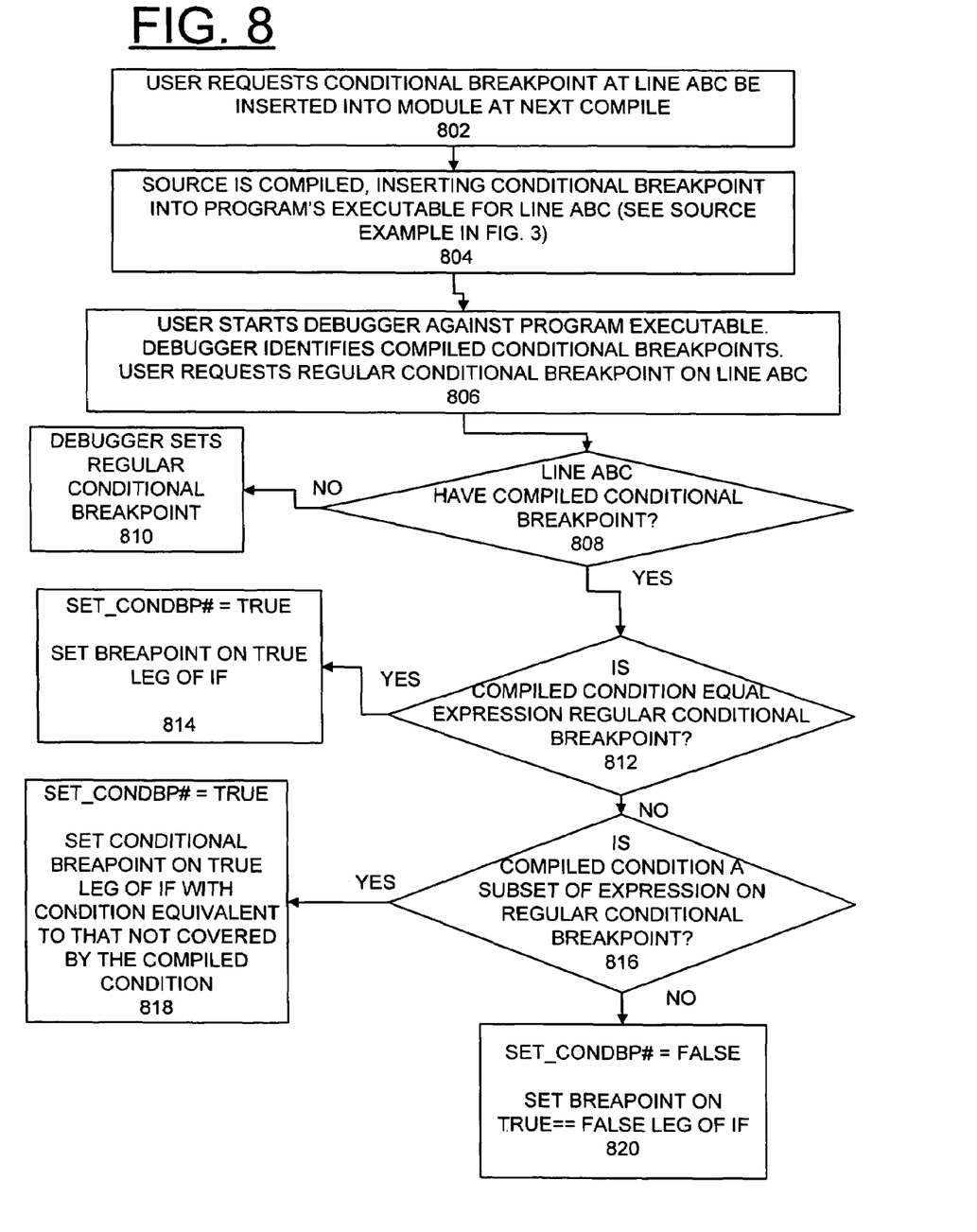
FIG. 8 is a flow chart illustrating exemplary steps for implementing enhanced compiled breakpoint analysis in accordance with the preferred embodiment.

Referring now to FIG. 8, there are shown exemplary steps for implementing enhanced compiled breakpoint analysis in accordance with the preferred embodiment. As indicated in a block 802, a user requests a conditional breakpoint at a particular line ABC be inserted into a test module at a next compile, for example, using the GUI of the debugger program 132 of FIG. 4. Source is compiled, inserting the conditional breakpoint into the program's executable for line ABC as indicated in a block 804. For example, the compiler gets compiled breakpoint information from a file written by the debugger program 132. From this data, the compiler replaces a program statement at the breakpoint location with an IF statement such as, the source code example in FIG. 2. As indicated in a block 806, a user starts debugger against program executable; the debugger program 132 identifies compiled conditional breakpoints; and the user requests a regular conditional breakpoint on the line ABC. Checking is performed using the compiled breakpoint table 138 to determine whether the line ABC has a compiled conditional breakpoint as indicated in a decision block 808. If line ABC does not have a compiled conditional breakpoint, then the debugger program 132 sets a regular conditional breakpoint as indicated in a block 810. If the line ABC has a compiled conditional breakpoint, then checking is performed to determine whether the compiled condition is equal expression on the regular conditional breakpoint as indicated in a decision block 812. If so, then a normal breakpoint is set, as indicated in a block 814 with Set_condbp#=TRUE and the non-conditional breakpoint is set on the TRUE leg of the IF statement. Otherwise if determined that the compiled condition is not equal expression on the regular conditional breakpoint, then checking is performed to determine whether the compiled condition is a subset of expression on the regular conditional breakpoint as indicated in a decision block 816. If the compiled condition is a subset of expression on the regular conditional breakpoint, then Set_condbp#=TRUE and the regular conditional breakpoint is set on the TRUE leg of the IF statement with condition equivalent to that not covered by the compiled condition as indicated in a block 818. Otherwise if determined that the compiled condition is not a subset of expression on the regular conditional breakpoint, then Set_condbp#=FALSE and the conditional breakpoint is set on the FALSE leg of the IF statement as indicated in a block 820.

Figure 9:
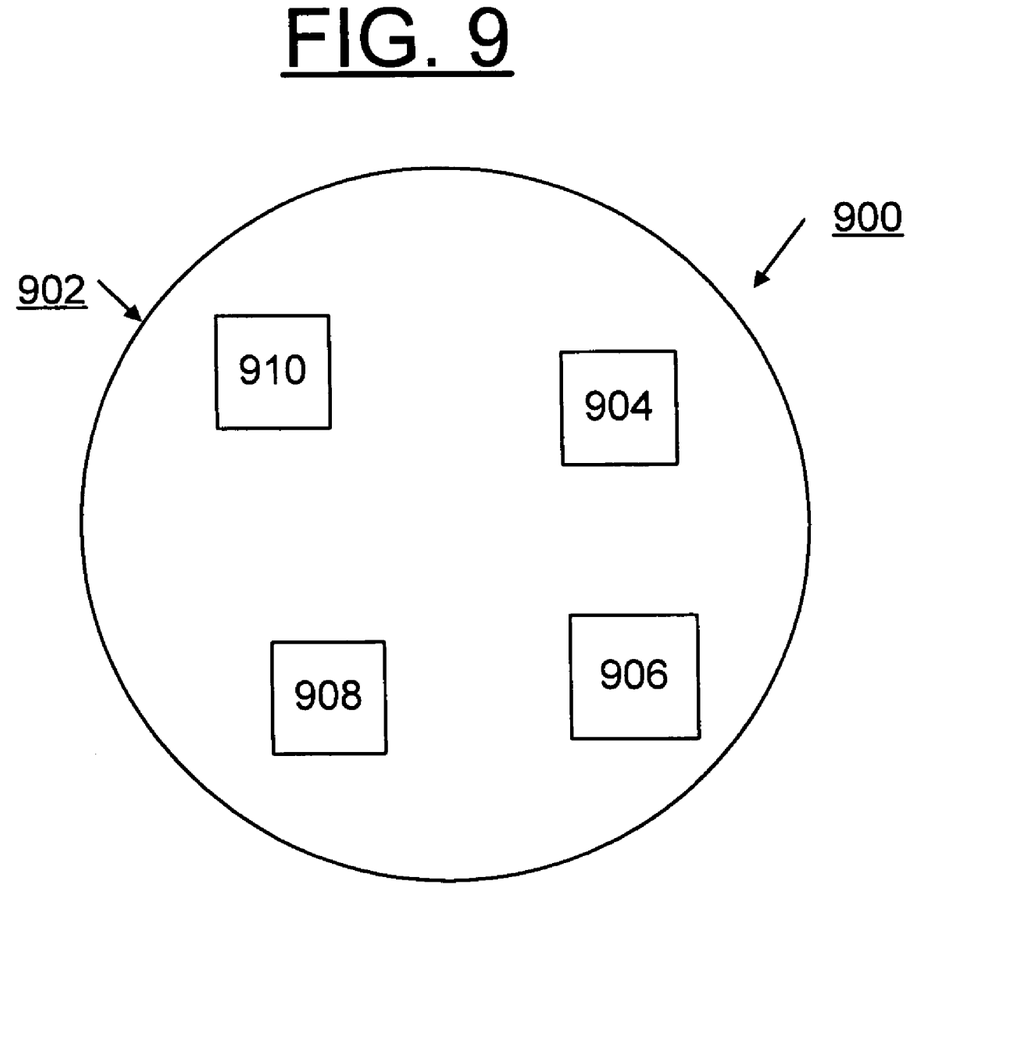
FIG. 9 is a block diagram illustrating a computer program product in accordance with the preferred embodiment.

Referring now to FIG. 9, an article of manufacture or a computer program product 900 of the invention is illustrated. The computer program product 900 includes a recording medium 902, such as, a floppy disk, a high capacity read only memory in the form of an optically read compact disk or CD-ROM, a tape, or a similar computer program product. Recording medium 902 stores program means 904, 906, 908, 910 on the medium 902 for carrying out the methods for implementing enhanced compiled breakpoint analysis of the preferred embodiment in the system 100 of FIGS. 1A and 1B.

A sequence of program instructions or a logical assembly of one or more interrelated modules defined by the recorded program means 904, 906, 908, 910, direct the computer system 100 for implementing enhanced compiled breakpoint analysis of the preferred embodiment.

While the present invention has been described with reference to the details of the embodiments of the invention shown in the drawing, these details are not intended to limit the scope of the invention as claimed in the appended claims.

What is claimed is:

1. A method for implementing compiled breakpoint analysis comprising:
    displaying a debugger graphical user interface for defining breakpoint properties in a program; responsive to a predefined user selection, exporting a conditional breakpoint and a breakpoint condition to be compiled for debug to an Integrated Development Environment (IDE);
    responsive to a source module being compiled for debug, inserting a conditional breakpoint code for the conditional breakpoint into the program executable of the source module for a user-selected line and introducing an identifier used to determine if the conditional breakpoint is active;
    responsive to debugging the program executable, using compiled breakpoint information that provides statement numbers identified by a compiled breakpoint table for a true leg and a false leg of the compiled breakpoint condition for debug, identifying the compiled conditional breakpoint;
    responsive to a user request, specifying a regular conditional breakpoint for the user-selected line;
    determining whether the compiled breakpoint condition is the same or a subset of the actual breakpoint condition of the regular conditional breakpoint being specified;
    if the compiled breakpoint condition is not the same and the compiled breakpoint condition is the subset of the actual breakpoint condition, setting the regular conditional breakpoint on the true leg and setting the identifier to true to activate the regular conditional breakpoint; and
    if the compiled breakpoint condition is not the same and the compiled breakpoint condition is not the subset of the actual breakpoint condition, setting the regular conditional breakpoint on the false leg and the identifier is set to false.

2. The method for implementing compiled breakpoint analysis as recited in claim 1 wherein the step of exporting the conditional breakpoint and the breakpoint condition to be compiled for debug includes storing the compiled breakpoint information in the program.

3. The method for implementing compiled breakpoint analysis as recited in claim 2 includes storing said compiled breakpoint information including an address, a statement, and a replace opcode.

4. The method for implementing compiled breakpoint analysis as recited in claim 1 wherein the step responsive to debugging the program executable, of identifying the compiled conditional breakpoint includes formatting a visual indication for the compiled conditional breakpoint on the user-selected line.

5. The method for implementing compiled breakpoint analysis as recited in claim 4 further includes displaying text with the compiled breakpoint condition for debug.

6. The method for implementing compiled breakpoint analysis as recited in claim 1 further includes selectively setting the regular conditional breakpoint on said true leg or said false leg of said compiled breakpoint condition.

7. Apparatus having a processor for implementing compiled breakpoint analysis in a computer system comprising:
    a debugger graphical user interface receiving user selections for defining breakpoint properties in a program stored on a computer recording medium; said computer recording medium storing instructions;
    a debugger stored on a computer recording medium storing instructions; said instructions of said debugger being executed by the processor, responsive to a predefined user selection, exporting a conditional breakpoint and a breakpoint condition to be compiled for debug to an Integrated Development Environment (IDE);
    said instructions of said debugger being executed by the processor, responsive to a source module being compiled for debug, providing a conditional breakpoint code for the conditional breakpoint inserted into the program executable of the source module for a user-selected line and introducing an identifier used to determine if the conditional breakpoint is active;
    said instructions of said debugger being executed by the processor, responsive to debugging the program executable, using compiled breakpoint information that provides statement numbers identified by a compiled breakpoint table for a true leg and a false leg of the compiled breakpoint condition for debug, identifying the compiled conditional breakpoint;
    responsive to a user request, specifying a regular conditional breakpoint for the user-selected line;
    determining whether the compiled breakpoint condition is the same or a subset of the actual breakpoint condition of the regular conditional breakpoint being specified;
    if the compiled breakpoint condition is not the same and the compiled breakpoint condition is the subset of the actual breakpoint condition, setting the regular conditional breakpoint on the true leg and setting the identifier to true to activate the regular conditional breakpoint; and
    if the compiled breakpoint condition is not the same and the compiled breakpoint condition is not the subset of the actual breakpoint condition, setting the regular conditional breakpoint on the false leg and the identifier is set to false.

8. The apparatus for implementing compiled breakpoint analysis as recited in claim 7 wherein said instructions of said debugger being executed by the processor, responsive to debugging the program executable, identifying the compiled conditional breakpoint, generate a visual indication of the compiled conditional breakpoint for the user-selected line.

9. The apparatus for implementing compiled breakpoint analysis as recited in claim 8 wherein said instructions of said debugger being executed by the processor, display text with the compiled breakpoint condition for debug.

10. The apparatus for implementing compiled breakpoint analysis as recited in claim 7 wherein said instructions of said debugger being executed by the processor, selectively set the regular conditional breakpoint on said true leg or said false leg of said compiled breakpoint condition.

11. A debugger computer program product stored on a computer recording medium for implementing enhanced compiled breakpoint analysis in a computer system, and when instructions of the product are executed by the computer system, said instructions cause the computer system to perform the steps of:

provoiding a debugger graphical user interface for defining breakpoint properties in a program;

responsive to a predefined user selection, exporting a conditional breakpoint and a breakpoint condition to be compiled for debug to an Integrated Development Environment (IDE);

responsive to a source module being compiled for debug, inserting a conditional breakpoint code for the conditional breakpoint into the program executable of the source module for a user-selected line and introducing an identifier used to determine if the conditional breakpoint is active;

responsive to debugging the program executable, using compiled breakpoint information that provides statement numbers identified by a compiled breakpoint table for a true leg and a false leg of the compiled breakpoint condition for debug, identifying the compiled conditional breakpoint;

responsive to a user request, specifying a regular conditional breakpoint for the line;

determining whether the compiled breakpoint condition is the same or a subset of the actual breakpoint condition of the regular conditional breakpoint being specified;

if the compiled breakpoint condition is not the same and the compiled breakpoint condition is the subset of the actual breakpoint condition, setting the regular conditional breakpoint on the true leg and setting the identifier to true to activate the regular conditional breakpoint; and if the compiled breakpoint condition is not the same and the compiled breakpoint condition is not the subset of the actual breakpoint condition, setting the regular conditional breakpoint on the false leg and the identifier is set to false.

12. The debugger computer program product for implementing enhanced compiled breakpoint analysis as recited in claim 11 wherein the step responsive to debugging the program executable, of identifying the compiled conditional breakpoint includes formatting a visual indication for the compiled conditional breakpoint on the user-selected line.

13. The debugger computer program product for implementing enhanced compiled breakpoint analysis as recited in claim 11 wherein the step responsive to debugging the program executable, of identifying the compiled conditional breakpoint includes displaying text of the compiled breakpoint condition for the compiled conditional breakpoint.

14. The debugger computer program product for implementing enhanced compiled breakpoint analysis as recited in claim 11 wherein the step of setting the conditional breakpoint on the user-selected line and identifying statement numbers for the true and false legs of the compiled condition includes selectively setting the regular conditional breakpoint on said true leg or said false leg of said compiled breakpoint condition.

* * * * *